(12) United States Patent
Raphaël

(10) Patent No.: US 6,785,964 B2
(45) Date of Patent: Sep. 7, 2004

(54) METHOD FOR MAKING A MECHANICAL SCREEN CYLINDER

(75) Inventor: Reig Raphaël, Potiers (FR)

(73) Assignee: Johnson Filtration Systems, Availles en Chatellerault (FR)

( * ) Notice: Subject to any disclaimer, the term of this patent is extended or adjusted under 35 U.S.C. 154(b) by 0 days.

(21) Appl. No.: 10/276,252

(22) PCT Filed: May 4, 2001

(86) PCT No.: PCT/FR01/01363

§ 371 (c)(1),
(2), (4) Date: Nov. 15, 2002

(87) PCT Pub. No.: WO01/87457

PCT Pub. Date: Nov. 22, 2001

(65) Prior Publication Data

US 2003/0115754 A1 Jun. 26, 2003

(30) Foreign Application Priority Data

May 16, 2000 (FR) .......................................... 00 06222

(51) Int. Cl.⁷ .............................................. B23P 15/16
(52) U.S. Cl. ...................... 29/896.62; 29/902; 210/346; 210/402
(58) Field of Search .............................. 29/896.62, 897, 29/890.046, 902, 521; 210/346, 486, 487, 488, 402, 403; 209/399, 406, 411

(56) References Cited

U.S. PATENT DOCUMENTS

| | | | | |
|---|---|---|---|---|
| 3,941,703 A | * | 3/1976 | Binard | 210/499 |
| 4,264,438 A | * | 4/1981 | Frejborg | 209/300 |
| 4,828,689 A | | 5/1989 | Lamort | |
| 4,846,971 A | | 7/1989 | Lamort | |
| 5,047,148 A | * | 9/1991 | Arai | 210/498 |
| 5,090,721 A | * | 2/1992 | Lange | 220/485 |
| 5,094,360 A | * | 3/1992 | Lange | 220/485 |
| 5,237,154 A | * | 8/1993 | Pellhammer et al. | 219/137 R |
| 5,255,790 A | * | 10/1993 | Einoder et al. | 209/393 |
| 5,387,340 A | * | 2/1995 | Ackerman | 210/497.01 |
| 5,718,826 A | * | 2/1998 | Frejborg | 210/402 |
| 5,755,034 A | * | 5/1998 | Yasue et al. | 29/896.62 |
| 5,768,783 A | * | 6/1998 | Lange | 29/897.15 |
| 5,788,860 A | * | 8/1998 | Yasue et al. | 210/346 |
| 5,791,495 A | | 8/1998 | Gero et al. | |
| 5,954,956 A | * | 9/1999 | Lutz et al. | 210/232 |
| 6,047,834 A | * | 4/2000 | Dolle et al. | 209/395 |
| 6,056,126 A | * | 5/2000 | Schabel et al. | 209/406 |
| 6,092,286 A | * | 7/2000 | Lange | 29/896.62 |
| 6,340,805 B1 | * | 1/2002 | Ljokkoi | 219/58 |
| 6,425,486 B1 | * | 7/2002 | Andersson et al. | 209/406 |
| 6,426,003 B2 | * | 7/2002 | May et al. | 210/498 |
| 6,460,757 B1 | * | 10/2002 | Ommundsen | 228/265 |
| 6,491,168 B1 | * | 12/2002 | Lutz et al. | 210/402 |
| 6,708,829 B2 | * | 3/2004 | Robertson et al. | 209/405 |

FOREIGN PATENT DOCUMENTS

| | | |
|---|---|---|
| WO | WO 9720104 | 6/1997 |
| WO | WO 9922064 | 5/1999 |

* cited by examiner

Primary Examiner—Essama Omgba
(74) Attorney, Agent, or Firm—Sughrue Mion, PLLC

(57) ABSTRACT

A method of manufacturing a mechanical basket (P) of substantially cylindrical shape for centripetal or centrifugal flow relative to an axis (R) and having rings (A) lying in planes perpendicular to the axis of revolution and wires (F) rigidly connected to the rings at regular intervals for the purpose of sieving a material is characterized in that assembling a wire (F) to a ring (A) is accomplished by a first operation of putting the wire (F) into position in a corresponding notch (EN) in the ring, and a second operation in which the wire is welded to the ring by melting a shoulder (EP1) of the ring, without adding any filler metal. In the method, a mechanical basket is made that presents better mechanical characteristics so that its lifetime is increased, and its cost of manufacture is reduced compared with conventional mechanical baskets.

3 Claims, 2 Drawing Sheets

FIG_1
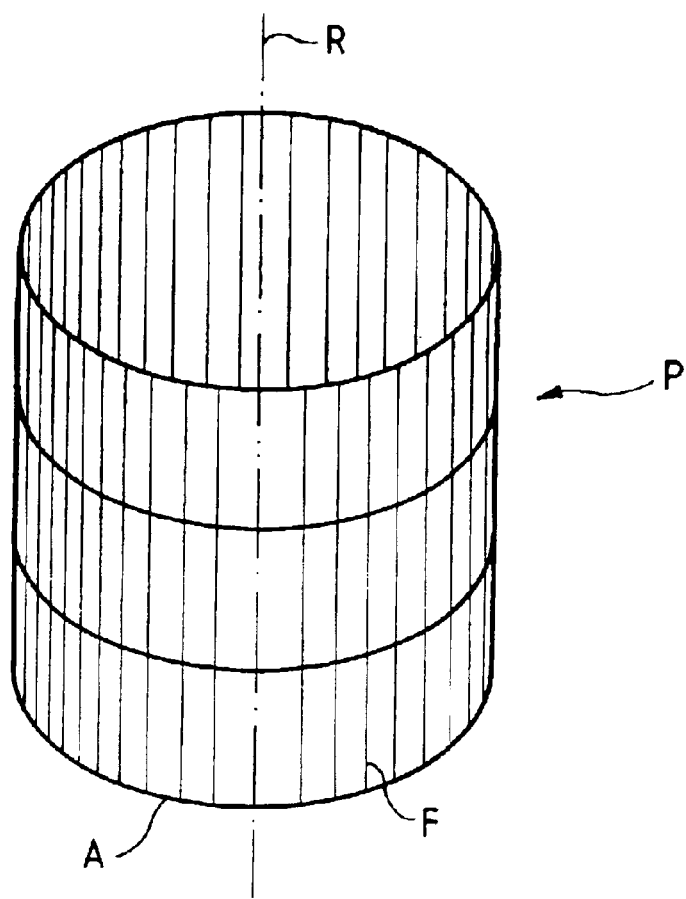
FIG_2
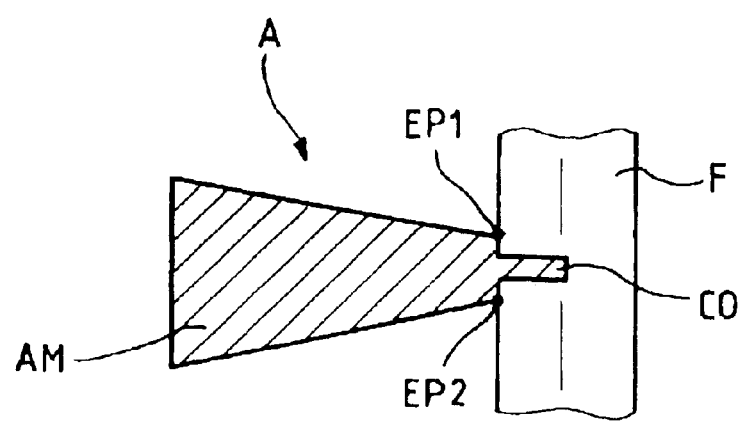

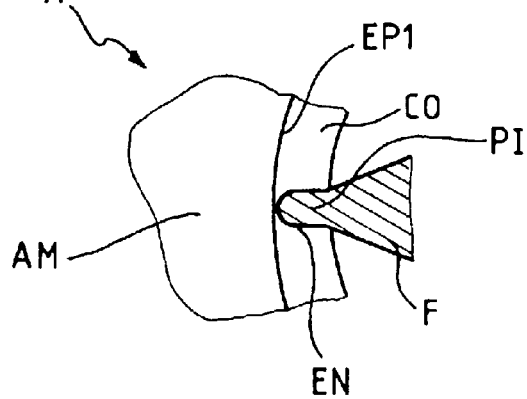
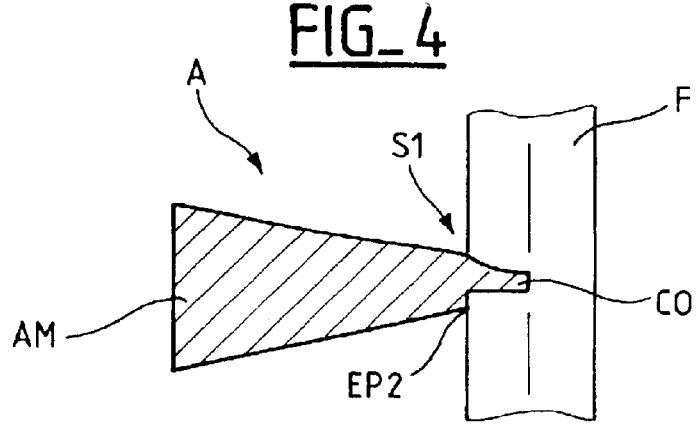
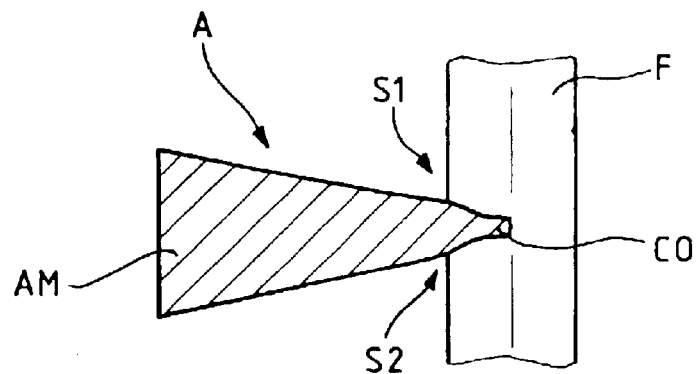

METHOD FOR MAKING A MECHANICAL SCREEN CYLINDER

The present invention relates to a method of manufacturing a cylindrical mechanical filter basket for centripetal or centrifugal flow, the basket comprising metal rings spaced along an axis of the basket and wires that are regularly spaced apart relative to one another and disposed around the periphery of the rings so as to form a cylindrical sieve.

Such a basket is generally used to filter an initial material by passing it through the sieve formed by the regularly spaced-apart wires so as to split the initial material into a first material of thick consistency that has not been able to pass through the sieve, and second material of more fluid consistency that has passed through the sieve. Thus, the initial material situated inside the basket can be caused to pass through the sieve, for example, by a centrifugal effect by causing the basket to rotate about its axis with rotary motion that is continuous or oscillatory, or that can be driven by a rotor placed inside the basket, so that at the end of the operation the first material can be recovered from the inside of the basket and the second material from the outside of the basket.

By way of example, such a basket is commonly used in the papermaking industry to filter paper pulp, however use thereof is more general and can be applied to other types of material that are to be filtered.

In the prior art concerning the manufacture of such baskets, it is the general practice in a first operation to make a plane sieve which is constituted by bars that are positioned horizontally and which have vertically-positioned wires attached thereto, e.g. by electric resistance welding or by binding, and then in a second operation the sieve is curved and the ends of the bars are welded together so as to form a cylindrical sieve.

The drawbacks of that solution lie not only in the rolling-up operation which generates firstly internal stresses in the basket tending to reduce its lifetime and which secondly represents extra manufacturing cost, but also in problems to do with the lifetime of the welds.

Thus, the lifetime of present baskets is relatively short, for a manufacturing cost that is relatively high.

The object of the invention is to remedy those drawbacks.

To this end, the invention provides a method of manufacturing a cylindrical mechanical filter basket for centripetal or centrifugal flow, the basket comprising metal rings spaced apart along an axis of the basket and wires regularly spaced apart from one another and disposed around the periphery of the rings to form a cylindrical sieve, the method being characterized in that it consists in:

a) providing shaped rings each having an annular core, an annular rim of smaller thickness than the annular core, at least one annular shoulder between the annular rim and the annular core, and notches regularly spaced apart in the rim;

b) placing wires in the notches of the rings so that the wires are disposed regularly spaced apart from one another around the periphery of the rings; and c) moving a heat source along the shoulder of each ring, the source being at a temperature that is high enough to melt the shoulder so that the molten metal from the shoulder provides a weld between each wire and the ring without any external filler metal.

With such a method of manufacture, the quality of the welds between the wires and the rings is improved, so the basket has greater strength, which increases its lifetime, while its manufacturing cost is less than the cost of manufacturing a conventional basket.

In particular implementations of the method of the invention, a ring is supplied with a rim that is thin enough to facilitate the machining of notches for receiving the wires, and a core that is thick enough to withstand the radial forces generated by the filtering operation, for example. Furthermore, it is also possible to provide wires of a particular section, e.g. comprising a root-forming portion of shape complementary to the notches so as to prevent the wire from turning relative to the ring while it is being put into position and further improve the quality of the welding between the rings and the wires so as to further increase the lifetime of the basket.

Finally, making a first weld on the top face of each ring and a second weld on the bottom face of each ring further increases the strength of the connections between the wires and the rings.

The invention is described below in greater detail with reference to the accompanying drawings which show an embodiment by way of non-limiting example.

FIG. 1 is an overall view of a basket comprising a sieve of substantially cylindrical shape obtained by the method of the invention.

FIG. 2 is a section view of a ring with a wire shown set back therefrom, the wire not being welded to the basket of FIG. 1.

FIG. 3 is a fragmentary plan view of a ring and a wire that is not welded thereto.

FIG. 4 is a section view of a ring with a wire shown set back therefrom and welded to the ring via the top face of the ring.

FIG. 5 is another section view of another ring with a wire shown set back therefrom, which wire is welded to the ring both via the top face of the ring and via the bottom face of the ring.

FIG. 1 is a diagrammatic perspective view of a basket P that can be manufactured using the method of the invention. The basket is cylindrical in shape about an axis R which can be an axis of rotation for the basket when in use. More particularly, the basket is constituted by rings A that are coaxial about the axis R and that are regularly spaced along said axis. Wires F are disposed parallel to the axis R and they are rigidly connected to the rings while being regularly spaced apart one another around the periphery of the rings. That wires F could be also helicoilly disposed (as an helix) around the periphery of the rings. The cylinder constitutes a sieve enabling filter operations to be performed in which an initial material can be separated into a first material of thick consistency and a second material of more fluid consistency by being filtered through the sieve.

FIG. 2 shows a shaped ring A seen in a section plane, behind which there is located a wire F that extends vertically. It is important to observe that in this figure the wire F is merely received in a notch and has not yet been welded to the ring A. More particularly, this section view shows a first or "core" zone AM in which the ring A is relatively thick, which core zone is integral with a second or "rim" zone CO of smaller thickness than the core, and in which the wire F is engaged. The core AM and the rim CO form a single piece, the core AM having thickness in cross-section that tapers in a radial direction going towards the rim CO. The rim CO can be of constant thickness in cross-section. The core AM is annular and thick so as to be capable of withstanding centripetal forces, for example, as generated by rotating the basket about its axis R, while the rim CO is annular and of small thickness so as to make it easier to machine notches therein for receiving the wires F. Finally, between the core AM and the rim CO, there is a first annular shoulder EP1 which is situated on the top face of the ring between the core AM and the rim CO, and a second annular shoulder EP2 symmetrical to EP1 about a horizontal plane and situated on the bottom face of the ring A.

The shaped ring A shown in the figures has its rim on its inside perimeter, and its core on the outside so that the wires are placed on the inside of the basket, however it is equally possible to use the method of the invention with a ring having its rim disposed on its outside perimeter so that the wires are on the outside of the cylindrical basket.

FIG. 3 shows a portion of the ring A in plan view together with a wire F engaged in a corresponding notch EN, the wire F being shown in section. It is important to observe that in this figure, the wire F is merely received in the notch EN and has not yet been welded to the ring. As in the preceding figure, it can be seen that the ring has an annular core AM, an annular shoulder EP1, and an annular rim CO.

More particularly, this view shows the notch EN in which a portion of the cross-section of the wire F is received and it also shows the shape of the cross-section of the wire F. This cross-section of the wire F has a root-forming portion PI which is engaged in the notch EN that is of complementary shape, thus presenting the advantage of positioning the wire F and of preventing it from twisting in a notch relative to the ring A while it is being welded. Furthermore, when the basket is rotating about the axis R and is filtering a material, forces are applied by the material that is to be filtered against the wire F in a direction that is tangential to the inside perimeter of the ring, and these forces tend specifically to separate the wires F from the rings A. By using a wire F that has a root-forming portion PI, the area of contact between the wire and the ring is increased, and thus the area of contact between the wire and the weld is increased, thereby increasing the strength of the weld between the wire F and the ring A. In addition, using such a wire with its root-forming portion PI makes it easier to position the wires on the rings prior to welding, and small irregularities in shape can be accommodated.

Finally, the notch EN can be machined by milling, by electro-erosion, or by any other machining method.

In FIG. 4, there can be seen a shaped ring A seen on a section plane and behind that plane there can be seen a wire F that extends vertically. In this figure, the wire F is welded to the ring A via a weld S1. More particularly, the weld S1 is made by melting the shoulder EP1 that can be seen in FIG. 2 without using any additional filler metal. In this way, the weld S1 can be provided in the method of the invention by continuously displacing a very small heat source along the annular shoulder EP1, e.g. using a tungsten-inert-gas (TIG) or a laser welding method to weld all of the wires to a given ring A in a single welding operation. Thus, molten metal spreads around the root-forming portion of each wire and provides a weld with good mechanical qualities.

In this figure, the wire is welded solely via the top face of the ring and the annular shoulder EP2 remains intact.

In FIG. 5, there can be seen a ring A and a wire F shown in the same manner as in FIG. 4. In this figure, the wire is welded to the ring A via a weld S1 in its top face and a weld S2 in its bottom face. As for the weld S1, the weld S2 is obtained by melting the shoulder EP2, using the same method.

The advantage of this second weld S2 is that it further improves the quality of the mechanical bond between the wires F and the rings A, thereby further increasing the strength of the basket so that its lifetime is even longer.

What is claimed is:

1. A method of manufacturing a cylindrical mechanical filter basket for centripetal or centrifugal flow, the basket comprising metal rings spaced apart along an axis of the basket and wires regularly spaced apart from one another and disposed around the periphery of the rings to form a cylindrical sieve, the method being characterized in that it comprises the steps of:

a) providing shaped rings each having an annular core, an annular rim of smaller thickness than the annular core, at least one annular shoulder between the annular rim and the annular core, and notches regularly spaced apart in the rim;

b) placing wires in the notches of the shaped rings so that the wires are disposed regularly spaced apart one another around the rings; and c) moving a heat source along the shoulder of each ring, the source being at a temperature that is high enough to melt the shoulder so that molten metal from the shoulder provides a weld between each wire and ring without any external filler metal.

2. The method of claim 1, wherein each shaped rings has a top face with a first annular shoulder and a bottom face with a second annular shoulder, and wherein said heat source is moved along both shoulders in order to weld each wire to both faces of a ring.

3. The method of manufacture of claim 1 wherein each wires has a cross-section that includes a root-forming portion which is inserted into corresponding notches of the rings.

* * * * *